United States Patent [19]

De Luca et al.

[11] Patent Number: 4,535,379

[45] Date of Patent: Aug. 13, 1985

[54] TELEPHONE PROTECTOR MODULE WITH AUXILIARY FUSIBLE ELEMENT

[75] Inventors: Paul V. De Luca, Plandome Manor; Helmuth Neuwirth, Garden City, both of N.Y.

[73] Assignee: Porta Systems Corp., Syosset, N.Y.

[21] Appl. No.: 604,882

[22] Filed: Apr. 27, 1984

[51] Int. Cl.$^3$ .............................................. H02H 9/06

[52] U.S. Cl. .................................... 361/124; 361/119; 337/32; 337/34

[58] Field of Search ........................ 361/124, 119, 120; 337/15, 28, 31, 32, 33, 34

[56] References Cited

U.S. PATENT DOCUMENTS

| | | | |
|---|---|---|---|
| 4,004,192 | 1/1977 | Carney | 361/124 |
| 4,335,416 | 6/1982 | Hollfelder et al. | 361/124 X |

*Primary Examiner*—Patrick R. Salce

*Attorney, Agent, or Firm*—Charles E. Temko

[57] ABSTRACT

A subscriber pair protector module of gas tube type in which the heat coil assembly is supplemented by the provision of a planar fusible member placed in direct contact with the gas tube elements to provide a heat sink for a limited period of time to protect the module until the heat coil assembly becomes operative, thereby preventing damage to the synthetic resinous housing element of the module which would interfere with its subsequent removal. An improved gas tube element is also disclosed having recesses disposed in the end surfaces thereof to prevent total shorting action by the heat coil element until the planar fusible member has melted. An improved gas tube element is also disclosed having recesses disposed in the end surfaces thereof to prevent total shorting action by the heat coil element until the planar fusible member has melted.

3 Claims, 4 Drawing Figures

TELEPHONE PROTECTOR MODULE WITH AUXILIARY FUSIBLE ELEMENT

BACKGROUND OF THE INVENTION

This invention relates generally to the field of telephony, and more particularly to an improved protector module of a type used to protect individual subscriber circuits from excess voltage and current surges. More particularly, it relates to a current surge protective means in modules of this type offering improved protection necessary to protect modern solid state circuitry now used by telephone companies in newer installations.

With the advent of recently published narrow window voltage requirements of the ESS No. 5 specifications, there has arisen a need for a module which will fire within a range of 215 to 265 volts, and do so as quickly as possible in order to avoid damage not only to the protective circuitry, but the module itself. Within this voltage range, conventional heat coils may require as much as 30 to 40 seconds to melt the fusible component of the heat coil assembly permitting the establishment of a direct path to a source of ground potential bypassing the gas tube elements.

In traditional heat coil construction, it is common to provide a cylindrical solder pellet which melts at relatively low temperatures. Other constructions employ a thin film of fusible material between a heat coil bobbin and a member slidably disposed within the bobbin. In the former case, a considerable amount of heat is necessary to melt to solder pellet. In the latter case, less heat is necessary, but the bobbin itself and the sliding member disposed therein must also be heated before the fusible interconnection melts.

Given the normal resistance of individual subscriber circuits, during the course of time required to melt conventional fusible components, the gas tube elements are required to transmit amounts of current for exceeding their normal capacity. This excess current manifests itself as heat, which if unabsorbed, can destroy the housing which encases the module, or so badly distort it that removal from a protector block is difficult if not impossible. It is to be appreciated that each protector module is normally installed in very close proximity to similar protector modules servicing other subscriber circuits, and that damage to the housing element of one such module through internally generated heat can often at least partially damage those other modules adjacent its periphery.

SUMMARY OF THE INVENTION

Briefly stated, the invention contemplates the provision of an improved telephone protector module of gas tube type in which an additional fusible element has been provided in direct communication with one end of each of the gas tube elements for the purpose of absorbing relatively large quantities of heat during that period in which the heat coil assembly is reaching the temperature at which it will fire. This additional element is of planar configuration and possessed of considerable volume. Additionally, it is formed of a high temperature eutectic solder having a melting temperature range between 350 degrees F. to 370 degrees F. A typical composition to obtain this melting temperature is approximately 37% lead and 63% tin. The auxiliary fusible element is located within the module at the precise location of heat generation, i.e. at one end of the gas tube elements. At the other end of the gas tube elements there is positioned a ceramic planar insulator which protects against the transmission of heat from the opposite end of the gas tube toward the cover or cap member which closes the module housing element.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
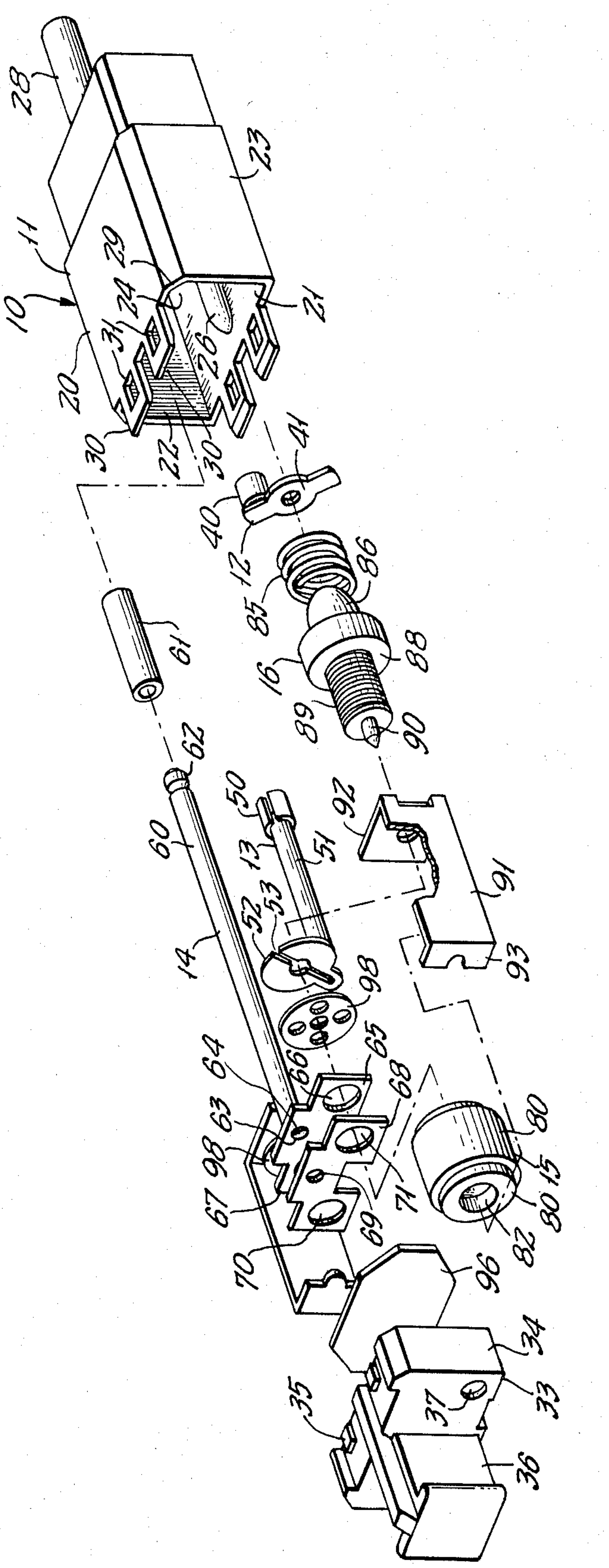
FIG. 1 is an exploded view in perspective of an embodiment of the invention.
Figure 3:
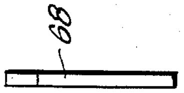
FIG. 3 is an end elevational view thereof.
Figure 2:
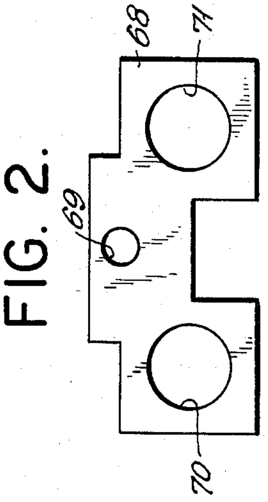
FIG. 2 is a view in elevation of an auxiliary fusible member forming a part of the embodiment.

In accordance with the invention, the device, generally indicated by reference character 10, comprises broadly: a housing element 11, a pair of short contacts, one of which is indicated by reference character 12, a pair of long contacts, one of which is indicated by reference character 13, a grounding element 14, a pair of gas tubes, one of which is indicated by reference character 15, and a pair of heat coil assemblies, one of which is indicated by reference character 16.

The housing element 11 is of generally conventional construction, preferably molded from suitable synthetic resinous materials. It is bonded by wider side walls 20 and 21, as well as narrower side walls 22 and 23, to define a cavity 24 in which the elements 12–16 are enclosed. Disposed upon an inner surface 25 of the wall 20 is an aligning rib 26 which provides a separation between the tip and ring sides of the module. A hollow projection 28 extends from the inner end of the housing to support the grounding element 14. An outer peripheral edge 29 is provided with plural projections 30 having openings 31 for the engagement of a corresponding cap member 33. The member 33 includes an end wall 34 having corresponding lugs 35 and an outwardly extending handle 36 of well-known type. Openings 37 are provided to give access to internal contacts, again, as known in the art.

The short contacts 12 are preferably formed as metallic stampings, and include a pin-engaging socket 40, and a transverse member 41 which intersects the axis of the respective heat coil assembly 16.

The long contacts 13 are also conventional, including a pin-engaging socket 50, a longitudinally extending member 51, and a transversely extending member 52 which intersects the axis of the heat coil assembly 16.

The grounding element 14 includes a ground pin 60 mounting an insulating member 61 thereon. An outer end 62 is adapted to engage a terminal on a supporting protector block (not shown). The inner end 63 thereof is swaged about an opening 64 in a transversely extending ground plate 65 having second and third openings 66 and 67 axially arranged with respect to the heat coil assemblies 16. Mounted in congruent relation to the ground plate 65 is a solder plate 68 having corresponding openings 69, 70 and 71. As has been mentioned hereinabove, the solder plate is formed of a eutectic solder having a relatively high melting point, approximately 37% lead and 63% tin. It is approximately 125th of an inch thick, ¼ of an inch wide, and slightly over ½ inch long, thereby providing sufficient volume to permit the absorption of relatively large amounts of heat eminating from the gas tube elements before reaching fusing temperature.

The gas tube elements 15 are of known type, commonly referred to as two element construction. Each includes an outer casing 80 and conductive end caps 81 each having a recessed well 82 the purpose of which will become more clearly apparent. They are filled with an inert gas which becomes conductive at a predetermined voltage range.

The heat coil assemblies 16 are also generally conventional, including a spring 85, a molded cap 86, a conductive sleeve 87, a bobbin 88 and a heat coil winding 89. A pin 90 is carried by the cap 86 and engages an opening in a C-shaped contact 91 having end walls 92 and 93 interconnected by side wall 94. After assembly, the end wall 93 is disposed beneath the respective opening 37 for access to test equipment (not shown). An insulative plate 96 of ceramic material overlies the end walls 93 to shield the cap member 33 against excessive heat.

During operation, upon the occurrence of an excessive current surge, the heat coil assemblies 16 will immediately begin to heat the bobbins 88. However, the fusible interconnection between the pin 90 and the bobbin 88 will normally require approximately 30 to 40 seconds to reach fusing temperature prior to the release of the spring 85 which causes the pin 90 to engage the slotted opening 53 in the long contact 13, and pass through the central opening in the air gap insulator 98 to engage the end cap 81, thus establishing a ground connection through the solder plate 68 to the ground plate 65 and ground pin 60. Prior to the release of the spring 85, excess heat is absorbed by the solder plate 68, thereby preventing this heat from damaging the housing element 11 or any of the other internal parts. By the time the solder plate is melted, the heat coil assembly has fired and continues the short of the gas tube element.

Figure 4:
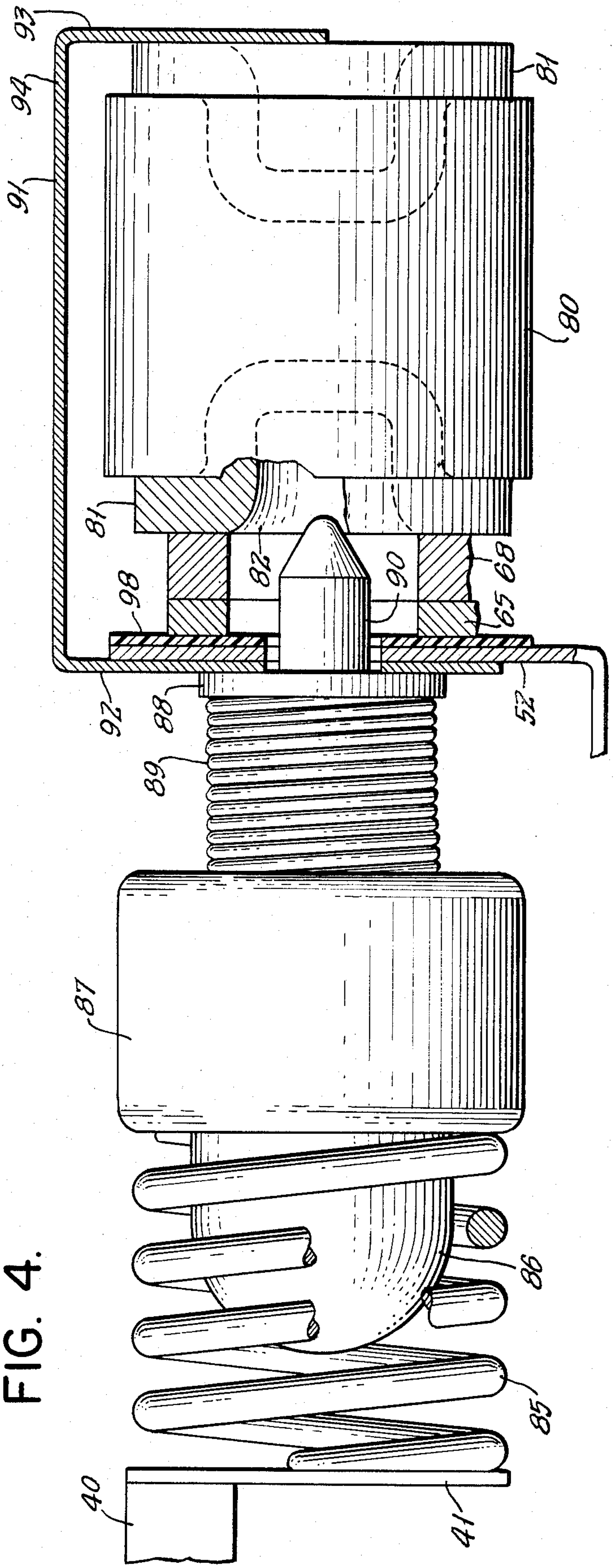
FIG. 4 is an enlarged fragmentary view in elevation of a heat coil and gas tube assembly forming components of the disclosed embodiment.

As seen in FIG. 4, the gas tube elements 15 form a pair of oppositely disposed wells 82, the purpose of which is to prevent contact with the pin 90 prematurely. Should the heat coil element 16 fire before the solder plate 68 has melted, the pin 80 is still maintained out of contact with the well 82, thus assuring that a maximum heat sink effect is obtained prior to shorting.

I wish it to be understood that I do not consider the invention limited to the precise details of structure shown and set forth in this specification, for obvious modifications will occur to those skilled in the art to which the invention pertains.

We claim:

1. In a telephone protector module for protecting individual subscriber pairs, including a housing, a pair of long and short contacts for tip and ring circuits, a pair of heat coil assemblies for protecting against excess current surges, a pair of arcing devices for protecting against excess voltage surges, and a grounding element communicating with said tip and ring circuits, the improvement comprising: said grounding element including a ground pin axially aligned within said housing and having an outer end projecting outwardly therefrom, said ground pin having an inner end; a planar ground plate secured to said inner end and lying in a plane perpendicular to the axis of said pin, said ground plate having laterally extending portions overlying one end of said arcing devices; a solder plate of fusible material maintained in congruent relation to said ground plate, and interposed between said ground plate and arcing devices, said solder plate serving as a heat sink upon the occurrence of an excess current surge during a period prior to the firing of said heat coil assemblies.

2. The improvement in accordance with clam 1, said solder plate being formed of a eutectic fusible material having a melting temperature ranging from 350 degrees F. to 370 degrees F.

3. The improvement in accordance with claim 1, further characterized in said arcing devices being configured to prevent shorting action by the firing of said heat coil until said solder plate is totally fused.

* * * * *